US011372081B2

(12) United States Patent
Lehne et al.

(10) Patent No.: US 11,372,081 B2
(45) Date of Patent: Jun. 28, 2022

(54) APPARATUS, SYSTEM AND METHOD OF LEAKAGE CANCELLATION FOR MULTIPLE INPUT MULTIPLE OUTPUT (MIMO) RADAR

(71) Applicant: INTEL CORPORATION, Santa Clara, CA (US)

(72) Inventors: Mark A. Lehne, Hillsboro, OR (US); Dan Ohev Zion, Ra'anana (IL); Alon Cohen, Modi'in-Maccabim-Reut (IL); Arnaud Amadjikpe, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 233 days.

(21) Appl. No.: 16/727,978

(22) Filed: Dec. 27, 2019

(65) Prior Publication Data

US 2020/0132805 A1    Apr. 30, 2020

(51) Int. Cl.
*G01S 13/931*    (2020.01)
*G01S 7/03*    (2006.01)

(52) U.S. Cl.
CPC ............ *G01S 7/038* (2013.01); *G01S 13/931* (2013.01)

(58) Field of Classification Search
CPC ......... G01S 13/42; G01S 13/931; G01S 7/038
See application file for complete search history.

(56) References Cited

U.S. PATENT DOCUMENTS

| 2009/0232260 A1* | 9/2009 | Hayashi | H04B 1/525 375/346 |
| 2017/0307729 A1* | 10/2017 | Eshraghi | G01S 7/2813 |
| 2020/0003866 A1* | 1/2020 | Bauduin | G01S 13/931 |

FOREIGN PATENT DOCUMENTS

CN    106353737 A  *  1/2017

* cited by examiner

*Primary Examiner* — Timothy A Brainard
(74) *Attorney, Agent, or Firm* — Shichrur & Co.

(57) ABSTRACT

For example, a MIMO radar may include a plurality of Tx chains to process a plurality of digital Tx signals for transmission of a plurality of Tx RF signals; a plurality of Rx chains configured to output a plurality of digital Rx signals based on a plurality of Rx RF signals and a plurality of digital leakage-cancellation signals, wherein an Rx chain of the plurality of Rx chains is configured to output a digital Rx signal based on an Rx RF signal and a digital leakage-cancellation signal corresponding to the Rx chain; and a digital MIMO filter to generate the plurality of digital leakage-cancellation signals based on the plurality of digital Tx signals, the digital MIMO filter configured to generate the digital leakage-cancellation signal corresponding to the Rx chain by applying to the plurality of digital Tx signals a respective plurality of filters corresponding to the Rx chain.

24 Claims, 4 Drawing Sheets

APPARATUS, SYSTEM AND METHOD OF LEAKAGE CANCELLATION FOR MULTIPLE INPUT MULTIPLE OUTPUT (MIMO) RADAR

TECHNICAL FIELD

Embodiments described herein generally relate to leakage cancellation for Multiple Input Multiple Output (MIMO) radar.

BACKGROUND

Radar systems used for ranges up to several hundreds of meters may require simultaneous communication of transmit (Tx) and receive (Rx) signals.

Multiple Input Multiple Output (MIMO) techniques may be used in order to achieve high angular resolution of a radar system. For example, a large number of transmitters and receivers may be simultaneously used in the radar system.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
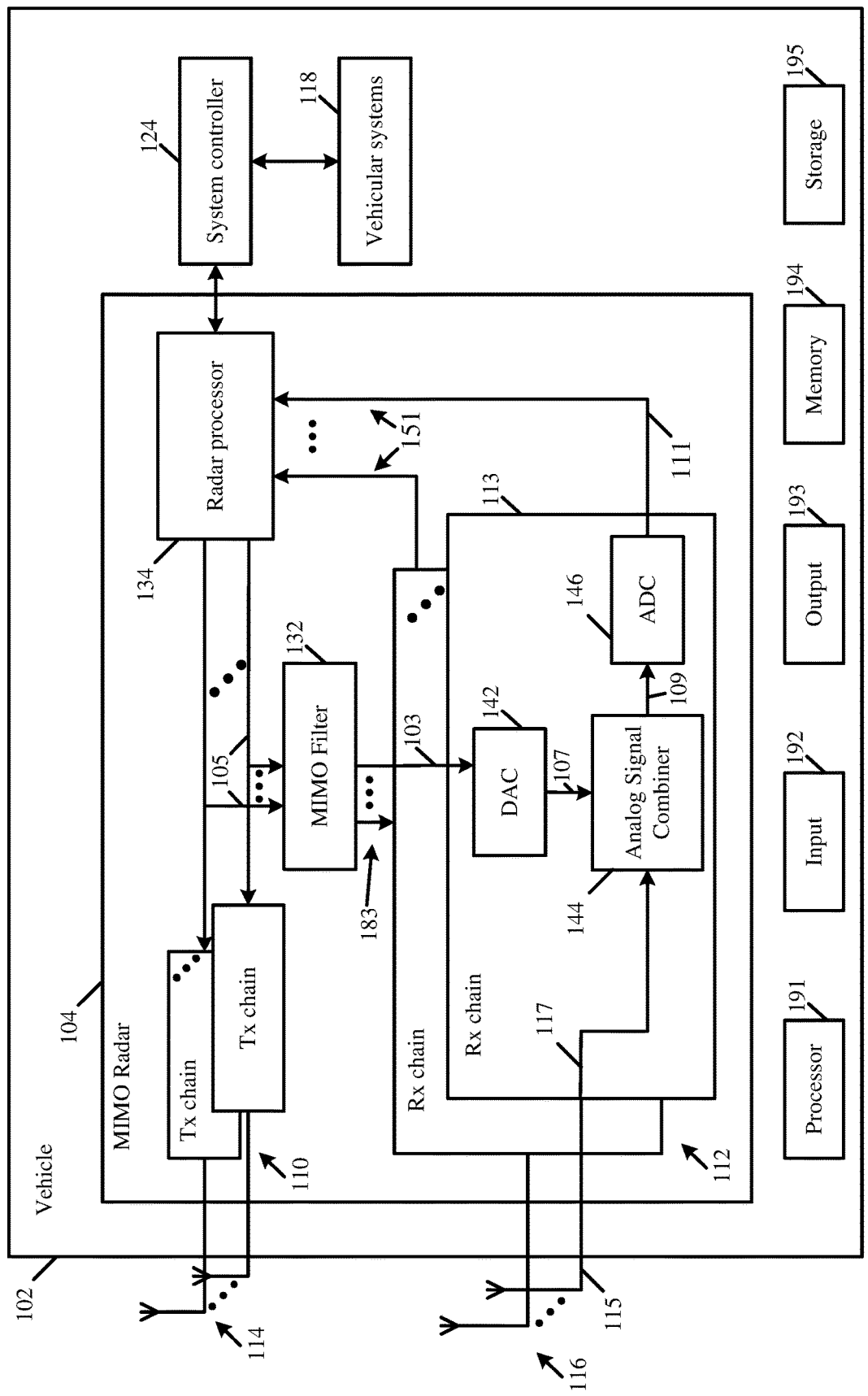
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a radar sensor, a radar device, a radar system, a vehicle, a vehicular system, an autonomous vehicular system, a vehicular communication system, a vehicular device, a sensor device, a User Equipment (UE), a Mobile Device (MD), a non-vehicular device, a mobile or portable device, a consumer device, a non-mobile or non-portable device, a wireless communication station, a wireless communication device, and the like.

Some embodiments may be used in conjunction with Radio Frequency (RF) systems, radar systems, vehicular radar systems, detection systems, or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with an RF frequency in a frequency band having a starting frequency above 10 Gigahertz (GHz), for example, a frequency band having a starting frequency between 10 Ghz to 120 GHz. For example, some demonstrative embodiments may be used in conjunction with an RF frequency having a starting frequency above 30 Ghz, for example, above 45 GHz, e.g., above 60 GHz. For example, some demonstrative embodiments may be used in conjunction with an automotive radar frequency band, e.g., a frequency band between 76 GHz and 81 GHz. However, other embodiments may be implemented utilizing any other suitable frequency bands.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to RF radar signals. However, other embodiments may be implemented with respect to any other wireless signals, wireless communication signals, communication scheme, network, standard and/or protocol.

Reference is now made to FIG. 1, which schematically illustrates a block diagram of a system 100, in accordance with some demonstrative embodiments.

In some demonstrative embodiments, system 100 may include a vehicular system, for example, a system to be implemented and/or mounted in a vehicle.

In one example, system 100 may include an autonomous vehicle system, an automated driving system, a driver assistance and/or support system, and/or the like.

In some demonstrative embodiments, system 100 may include a vehicle 102, e.g., as described below.

In some demonstrative embodiments, vehicle 102 may include a car, a truck, a motorcycle, a bus, or any other vehicle.

In some demonstrative embodiments, vehicle 102 may include a radar sensing device, a radar detecting device, a radar sensor, or the like, e.g., as described below.

In some demonstrative embodiments, vehicle 102 may include a Multiple-Input-Multiple-Output (MIMO) radar 104 configured to detect, and/or sense, one or more objects, which are located in a vicinity, e.g., a far vicinity and/or a near vicinity, of vehicle 102, and to provide one or more parameters, attributes and/or information with respect to the objects.

In some demonstrative embodiments, the objects may include other vehicles, pedestrians, traffic signs, traffic lights, roads and/or the like.

In some demonstrative embodiments, the one or more parameters, attributes and/or information with respect to the objects may include a range of the object from vehicle 102, a location of the object with respect to vehicle 102, a relative speed of the object, and/or the like.

In some demonstrative embodiments, MIMO radar 104 may be configured to detect targets in a vicinity of vehicle 102, e.g., in a far vicinity and/or a near vicinity, for example, using RF and analog chains, capacitor structures, large spiral transformers and/or any other electronic or electrical elements. In one example, MIMO radar 104 may be mounted onto, placed directly onto, or attached to, vehicle 102.

In some demonstrative embodiments, MIMO radar 104 may be configured to utilize MIMO techniques, e.g., utilizing a relatively large number of transmitters and receivers simultaneously, for example, to achieve high angular resolution in detecting, and/or sensing one or more objects, which are located in a vicinity of vehicle 102.

In some demonstrative embodiments, MIMO radar 104 may be configured to utilize simultaneous communication of Transmit (Tx) and Receive (Rx) signals, for example, to support sensing targets in a range of up to several hundred of meters of vehicle 102, e.g., as described below.

In some demonstrative embodiments, MIMO radar 104 may include a plurality of Tx antennas 114 configured to transmit a plurality of Tx RF signals; and a plurality of Rx antennas 116 configured to receive a plurality of Rx RF signals, e.g., as described below.

In some demonstrative embodiments, MIMO radar 104 may include one or more radios configured to generate and transmit the Tx RF signals via Tx antennas 114; and/or to process the Rx RF signals received via Rx antennas 116, e.g., as described below.

In some demonstrative embodiments, the one or more radios may include circuitry and/or logic to perform radar detection, e.g., as described below.

In one example, the one or more radios may include one or more receivers including circuitry and/or logic to receive RF signals and/or radar signals, e.g., as described below.

In another example, the one or more radios may include one or more transmitters including circuitry and/or logic to transmit RF signals and/or radar signals, e.g., as described below.

In some demonstrative embodiments, the one or more radios may include circuitry; logic; RF elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like, e.g., as described below.

In some demonstrative embodiments, MIMO radar 104 may include a plurality of Tx chains 110 configured to generate and transmit the Tx RF signals; and/or a plurality of Rx chains 112 configured to receive and process the Rx RF signals, e.g., as described below.

In some demonstrative embodiments, MIMO radar 104 may include a radar processor 134 configured to generate radar information, for example, based on the radar signals communicated by MIMO radar 104, e.g., as described below.

In some demonstrative embodiments, vehicle 102 may include a system controller 124 configured to control one or more functionalities, components, devices and/or elements of vehicle 102.

In some demonstrative embodiments, system controller 124 may be configured to control vehicle 102, and/or to process one or more parameters, attributes and/or information from MIMO radar 104.

In some demonstrative embodiments, system controller 124 may be configured, for example, to control one or more vehicular systems 118 of the vehicle, for example, based on the radar information from MIMO radar 104 and/or one or more other sensors of the vehicle, e.g., Light Detection and Ranging (LIDAR) sensors, camera sensors, and/or the like.

In one example, system controller 124 may control a steering system, a braking system, and/or any other system of the vehicle, for example, based on the radar information from MIMO radar 104, e.g., based on one or more objects detected by MIMO radar 104.

In other embodiments, system controller 124 may be configured, for example, to control any other functionalities of system 100.

In some demonstrative embodiments, vehicle 102 may include, for example, one or more of a processor 191, an input unit 192, an output unit 193, a memory unit 194, and/or a storage unit 195. Vehicle 102 may optionally include other suitable hardware components and/or software components. In some demonstrative embodiments, some or all of the components of one or more of vehicle 102 may be enclosed in a common housing or packaging, and may be interconnected or operably associated using one or more wired or wireless links. In other embodiments, components of one or more of vehicle 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS), e.g., a vehicular operating system, of vehicle 102 and/or of one or more suitable applications.

In some demonstrative embodiments, input unit 192 may include, for example, a touch-screen, a touch-pad, a trackball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by vehicle 102.

In some demonstrative embodiments, MIMO radar 104 may be configured to utilize co-located Tx and Rx antennas, e.g., Tx antennas 114 and Rx antennas 116, for example, to support a radar solution with a small form factor.

In some demonstrative embodiments, utilizing co-located Tx and Rx antennas may result in increased Tx-to-Rx leakage, which may degrade the dynamic range and/or overall performance.

In some demonstrative embodiments, utilizing high performance hardware in Rx chains of a radar system to overcome the problem of Tx-to-Rx leakage may have one or more technical inefficiencies, disadvantages and/or problems in one or more use cases and/or scenarios. For example, the high performance hardware, which may be configured to increase the linearity of the analog circuits of the Rx chains and to lower other impairments such as IQ mismatch, may have a relatively high power consumption, price and/or size.

In some demonstrative embodiments, there may be one or more technical inefficiencies, disadvantages and/or problems in utilizing a Single-Input-Single-Output (SISO) analog Tx cancellation technique. For example, the SISO analog Tx cancellation technique may include passing a signal split from a Tx path through a variable analog phase shifter and an attenuator, and injecting it to an Rx channel using, for example, by a coupler configured to sum up the injected Tx signal with an actual received signal, a transformer or an RF splitter. In one example, Low Noise Amplifier (LNA) stages may be split with an RF transformer, and a cancellation signal may be coupled into the LNA second stage. However, implementing this technique for a MIMO radar with X Transmitters and Y receivers, may result in X*Y different pairs of phase shifters and attenuators, e.g., in order to cancel the leakage from each Tx antenna to each Rx antenna. Therefore, this technique may not be feasible in terms of power consumption, size and/or cost.

In some demonstrative embodiments, MIMO radar 104 may be configured to generate an individual leakage cancellation signal for a receiver, for example, for each of the receivers of MIMO radar 140, e.g., as described below.

In some demonstrative embodiments, MIMO radar 104 may be configured to generate samples of a cancellation signal, e.g., samples of each cancellation signal, from digital filtering of samples of some or all transmit signals. For example, as this technical solution may not require extra memory for storing the samples, e.g., as described below.

In some demonstrative embodiments, the cancelation signal may be injected in a baseband section and/or RF section of a receiver of MIMO radar 104, for example, as a current or a voltage source, e.g., as described below.

In some demonstrative embodiments, MIMO radar 104 may be configured to adaptively and/or dynamically calculate coefficients of a digital filter, e.g., for each of the digital filters, for example, during operation of MIMO radar 104, e.g., as described below.

In some demonstrative embodiments, coefficients of one or more of the digital filters, e.g., each of the digital filters, may be pre-set, for example, in a factory calibration, e.g., as described below.

In other embodiments, the coefficients of one or more of the digital filters may be defined using any other additional or alternative techniques.

In some demonstrative embodiments, MIMO radar 104 may be configured to utilize an analog cancellation technique to mitigate the Tx-to-Rx leakage, for example, by generating the individual leakage cancellation signal for each of the receivers in MIMO radar 104, e.g., as described below.

In some demonstrative embodiments, utilizing the analog cancellation of the Tx-to-Rx leakage may increase a radar range, for example, by enabling MIMO radar 104 to sense smaller, weaker targets.

In some demonstrative embodiments, utilizing the analog cancellation of the Tx-to-Rx leakage may improve safety, for example, by supporting a higher dynamic range system and/or allowing MIMO radar 104 to provide better detection of weak targets, such as bicycles and/or pedestrians, for example, even when next to large objects, e.g., trucks.

In some demonstrative embodiments, MIMO radar 104 may be configured to perform the Tx-to-Rx leakage cancellation, for example, at a Mixer output, which may achieve improved leakage cancellation, e.g., by at least 20 dB, for example, with timing requirements of only a few picoseconds.

In some demonstrative embodiments, MIMO radar 104 may be configured to utilize the analog cancellation of the Tx-to-Rx leakage to achieve improved, e.g., much simpler, hardware implementation, for example, compared to a large number of different analog phase shifter and attenuator pairs. This improved hardware implementation may be integrated inside an ASIC, for example, even without requiring extra RAM.

In some demonstrative embodiments, MIMO radar 104 may be configured to utilize the analog cancellation of the Tx-to-Rx leakage to achieve improved, e.g., much more accurate, performance compared, for example, to a performance achieved by leakage cancellation using a pair of an analog phase shifter and an attenuator, for example, due to their limited resolution of phase, amplitude and delay compensation of signals.

In some demonstrative embodiments, MIMO radar 104 may include a plurality of Tx chains 110 configured to process a plurality of digital Tx signals 105 for transmission of a plurality of Tx RF signals via the plurality of Tx antennas 114, e.g., as described below.

In some demonstrative embodiments, MIMO radar 104 may include a plurality of Rx chains 112 configured to output a plurality of digital Rx signals 151, for example, based on a plurality of Rx RF signals and a plurality of digital leakage-cancellation signals 183, e.g., as described below.

In some demonstrative embodiments, an Rx chain 113 of the plurality of Rx chains 112 may be configured to output a digital Rx signal 111 of the plurality of digital Rx signals 151, for example, based on an Rx RF signal of the plurality of Rx RF signals and a digital leakage-cancellation signal 103 corresponding to Rx chain 113, e.g., as described below.

In some demonstrative embodiments, MIMO radar 104 may include a digital MIMO filter 132 configured to generate the plurality of digital leakage-cancellation signals 183, for example, based on the plurality of digital Tx signals 105, e.g., as described below.

In some demonstrative embodiments, digital MIMO filter 132 may be configured to generate digital leakage-cancellation signal 103 corresponding to Rx chain 113, for example, by applying to the plurality of digital Tx signals 105 a respective plurality of filters corresponding to Rx chain 113, e.g., as described below.

In some demonstrative embodiments, digital MIMO filter 132 may be configured to generate digital leakage-cancellation signal 103 corresponding to Rx chain 113, for example, to reduce leakage from Tx antennas 114 to Rx chain 113, e.g., as described below.

In some demonstrative embodiments, Rx chain 113 may include a Digital to Analog Converter (DAC) 142 configured to convert digital leakage-cancellation signal 103 corresponding to Rx chain 113 into an analog leakage-cancellation signal 107, e.g., as described below.

In some demonstrative embodiments, Rx chain 113 may include an analog signal combiner 144 configured to combine analog leakage-cancellation signal 107 with an analog Rx signal 117, which is based on the Rx RF signal, for example, received via an Rx antenna 115, e.g., as described below.

In some demonstrative embodiments, analog signal combiner 144 may be configured to combine analog leakage-cancellation signal 107 with analog Rx signal 117, for example, in an RF section of Rx chain 113, e.g., as described below.

In some demonstrative embodiments, analog signal combiner 144 may be configured to combine analog leakage-cancellation signal 107 with analog Rx signal 117, for example, at a mixer output of Rx chain 113, e.g., as described below.

In one example, analog leakage-cancellation signal 107 may be combined with analog Rx signal 117, for example, by injecting analog leakage-cancellation signal 107 as a current into a mixer output of Rx chain 113. In one example, the RF mixer may be the largest non-linearity contributor in the receive analog signal chain. Therefore, injecting analog leakage-cancellation signal 107 as a current into the mixer output of Rx chain 113 may cancel a signal before being corrupted by the mixer, but may effect the cancellation with a baseband current which allows the most accurate cancellation.

In some demonstrative embodiments, analog signal combiner 144 may be configured to combine analog leakage-cancellation signal 107 with analog Rx signal 117, for example, at an input to an LNA of Rx chain 113, e.g., as described below.

In one example, analog leakage-cancellation signal 107 may be combined with analog Rx signal 117, for example, by injecting analog leakage-cancellation signal 107 into a directional coupler located at the LNA input. This location has the advantage of being able to cancel, e.g., fully cancel, non-linearities from any part of the analog signal chain, although at this location it is the most difficult to implement precise cancellation due to timing uncertainty and unpredictability of the exact signal phase in the RF front-end due to signal Voltage Standing Wave Ratio (VSWR). For example, in order to reduce the impact of VSWR, analog leakage-cancellation signal 107 may be injected through a directional coupler, which, for example, only combines analog leakage-cancellation signal 107 with an incoming wave to the LNA, ignoring an outgoing reflected wave from an LNA impedance mismatch.

In some demonstrative embodiments, analog signal combiner 144 may be configured to combine analog leakage-cancellation signal 107 with analog Rx signal 117, for example, after the LNA of Rx chain 113, e.g., as described below.

In other embodiments, analog signal combiner 144 may combine analog leakage-cancellation signal 107 with analog Rx signal 117 in any other RF section of RX chain 113.

In some demonstrative embodiments, analog signal combiner 144 may be configured to combine analog leakage-cancellation signal 107 with analog Rx signal 117, for example, in a baseband section of Rx chain 113, e.g., as described below.

For example, analog signal combiner 144 may combine analog leakage-cancellation signal 107 with analog Rx signal 117, for example, by injecting analog leakage-cancellation signal 107 within an analog baseband of Rx chain 113. This location may be relatively simple to implement, for example, with the highest quality of the leakage cancelation. However, since this location is after the mixer, the non-linearity contribution of the mixer itself may be difficult to cancel.

In some demonstrative embodiments, analog signal combiner 144 may include a signal coupler or a signal transformer, e.g., as described below.

In other embodiments, analog signal combiner 144 may include any other circuitry and/or logic to combine analog leakage-cancellation signal 107 with analog Rx signal 117.

In some demonstrative embodiments, MIMO radar 104 may include a radar processor 134 configured to determine a range-Doppler response, for example, based on plurality of digital Rx signals 151, e.g., as described below.

In some demonstrative embodiments, radar processor 134 may include, or may be implemented, partially or entirely, by circuitry and/or logic, e.g., one or more processors including circuitry and/or logic, memory circuitry and/or logic. Additionally or alternatively, one or more functionalities of radar processor 134 may be implemented by logic, which may be executed by a machine and/or one or more processors, e.g., as described below.

In some demonstrative embodiments, digital MIMO filter 132 may include an adaptive MIMO filter configured to dynamically adapt coefficients of the plurality of filters corresponding to Rx chain 113, for example, based on range-Doppler response information from radar processor 134, e.g., as described below.

In some demonstrative embodiments, the adaptive MIMO filter 132 may be configured to dynamically adapt the coefficients of the plurality of filters corresponding to Rx chain 113, for example, based on a range-Doppler response bin including a zero Doppler value and a smallest range value compared to other range-Doppler response bins including the zero Doppler value, e.g., as described below.

In some demonstrative embodiments, the plurality of filters corresponding to Rx chain 113 may include a plurality of preconfigured filters. For example, a preconfigured filter of the plurality of preconfigured filters may include a plurality of preset filter coefficients, e.g., as described below.

In some demonstrative embodiments, coefficients of the plurality of filters corresponding to Rx chain 113 may be based on an Rx impulse response of Rx chain 113, a plurality of Tx impulse responses of the plurality of Tx chains 110, and/or a plurality of leakage impulse responses between the plurality of Tx antennas 114 and an Rx antenna 115 corresponding to Rx chain 113, e.g., as described below.

Figure 2:
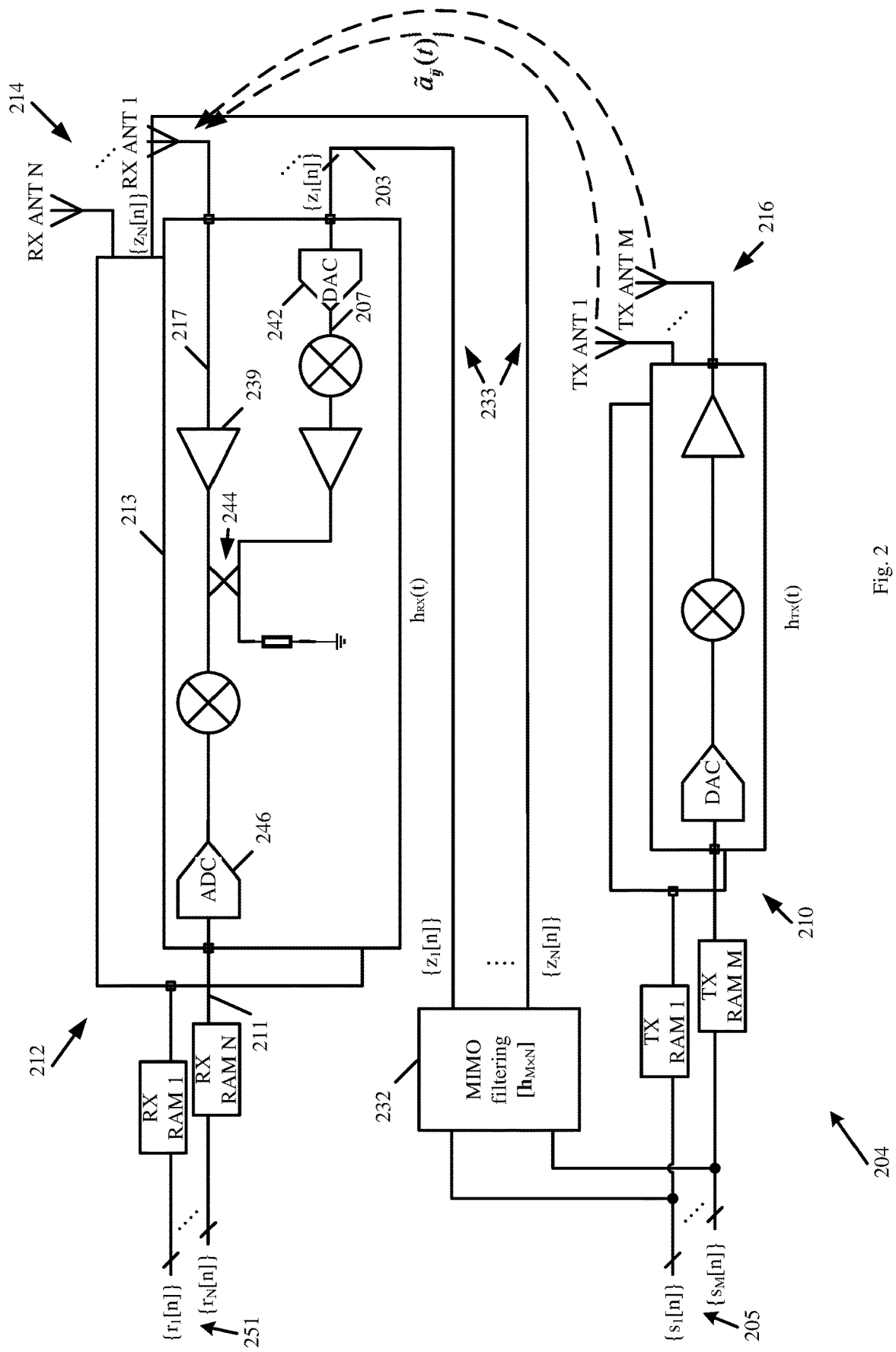
FIG. 2 is a schematic block diagram illustration of Multiple Input Multiple Output (MIMO) radar, in accordance with some demonstrative embodiments.

Reference is made to FIG. 2, which schematically illustrates a MIMO radar 204, in accordance with some demonstrative embodiments. For example, MIMO radar 104 (FIG. 1) may include, operate as, perform one or more operations of, and/or perform the functionality of, MIMO radar 204.

In some demonstrative embodiments, as shown in FIG. 2, MIMO radar 204 may include M>1 transmitters and N>1 receivers.

In some demonstrative embodiments, as shown in FIG. 2, the M transmitters may include a plurality of Tx antennas 216 and a plurality of Tx chains 210. For example, the plurality of Tx antennas 216 may include, operate as, perform one or more operations of, and/or perform the functionality of, the plurality of Tx antennas 114 (FIG. 1); and/or the plurality of Tx chains 210 may include, operate as, perform one or more operations of, and/or perform the functionality of, Tx chains 110 (FIG. 1).

In some demonstrative embodiments, as shown in FIG. 2, the N receivers may include a plurality of Rx antennas 214 and a plurality of Rx chains 212. For example, the plurality of Rx antennas 214 may include, operate as, perform one or more operations of, and/or perform the functionality of, the plurality of Rx antennas 116 (FIG. 1); and/or the plurality of Rx chains 212 may include, operate as, perform one or more operations of, and/or perform the functionality of, Rx chains 112 (FIG. 1).

In some demonstrative embodiments, the plurality of Tx chains 210 may be configured to process a plurality of digital Tx signals 205, denoted $\{s_j[n]\}$, $j=1, \ldots, M$, for transmission of a plurality of Tx RF signals via the plurality of Tx antennas 216.

In some demonstrative embodiments, the plurality of Rx chains 212 may be configured to output a plurality of digital Rx signals 251, denoted $\{r_i[n]\}$, $i=1, \ldots, N$, for example, based on a plurality of Rx RF signals and a plurality of digital leakage-cancellation signals 233, denoted $\{z_i[n]\}$, i=1, ..., N, wherein the plurality of Rx RF signals may be received via the plurality of Rx antennas 214, e.g., as described below In some demonstrative embodiments, as shown in FIG. 2, an Rx chain 213 of the plurality of Rx chains 212 may be configured to output a digital Rx signal 211 of the plurality of digital Rx signals 251, for example, based on an Rx RF signal of the plurality of Rx RF signals and a digital leakage-cancellation signal 203 corresponding to Rx chain 213, e.g., as described below. For example, Rx chain 213 may include, operate as, perform one or more operations of, and/or perform the functionality of, Rx chain 113 (FIG. 1).

In some demonstrative embodiments, MIMO radar 204 may include a digital MIMO filter 232 configured to generate the plurality of digital leakage-cancellation signals 233, for example, based on the plurality of digital Tx signals 205, e.g., as described below. For example, digital MIMO filter 232 may include, operate as, perform one or more operations of, and/or perform the functionality of, MIMO filter 132 (FIG. 1).

In some demonstrative embodiments, digital MIMO filter 232 may be configured to generate the digital leakage-cancellation signal 203 corresponding to Rx chain 213, for example, to reduce leakage from the plurality of Tx antennas 216 to Rx chain 213, e.g., as described below.

In some demonstrative embodiments, digital MIMO filter 232 may be configured to generate the digital leakage-cancellation signal 203 corresponding to Rx chain 213, for example, by applying to the plurality of digital Tx signals 205 a respective plurality of filters corresponding to Rx chain 213, e.g., as described below.

In some demonstrative embodiments, Rx chain 213 may include a DAC 242 configured to convert the digital leakage-cancellation signal 203 corresponding to Rx chain 213 into an analog leakage-cancellation signal 207, e.g., as described below. For example, DAC 242 may include, operate as, perform one or more operations of, and/or perform the functionality of, DAC 142 (FIG. 1).

In one example, it may be advantageous to implement DAC 242 using a high-speed complex DAC, for example, when injecting a leakage cancellation signal into an Rx chain. In one example, typical leakage signals may include large amplitude signals, e.g., larger than desired signals from close, strong reflectors. For example, the DAC may be capable of swinging a signal amplitude equal to or greater than the detected leakage signal. In one example, a DAC clock may be on the same clock domain as an Rx ADC clock. In one example, delay differences between the DAC and ADC may be managed to ensure, for example, that the digital reconstructed cancellation signal is precisely aligned with the phase of the undesired leakage signal. For example, the amplitude and/or phase alignment of these two signals may determine the level of cancellation possible. For example, the DAC 242 may be configured according to one or more of the following parameters:

TABLE 1

| cancellation signal DAC requirements | | | |
|---|---|---|---|
| Loopback DAC Requirements | Min | Max | Units |
| Gain matching accuracy | −0.25 | 0.25 | dB |
| Phase matching accuracy | −3 | 3 | Deg |
| Delay accuracy | −5 | 5 | pSec |
| Minimum number of bits | 6 | 11 | bits |

In other embodiments, DAC 242 may be configured according to any other parameters and/or criteria.

In some demonstrative embodiments, Rx chain 213 may include an analog signal combiner 244 configured to combine analog leakage-cancellation signal 207 with an analog Rx signal 217, which may be based on the Rx RF signal, e.g., as described below. For example, analog signal combiner 244 may include, operate as, perform one or more operations of, and/or perform the functionality of, analog signal combiner 144 (FIG. 1).

In some demonstrative embodiments, analog signal combiner 244 may be configured to combine analog leakage-cancellation signal 207 with analog Rx signal 217 in an RF section of Rx chain 213, e.g., as described above.

In some demonstrative embodiments, analog signal combiner 244 may be configured to combine analog leakage-cancellation signal 207 with analog Rx signal 217, for example, after an LNA 239 of Rx chain 213.

In some demonstrative embodiments, analog signal combiner 244 may be configured to combine analog leakage-cancellation signal 207 with analog Rx signal 217 at any other location along the Rx chain 213, e.g., as described above.

In some demonstrative embodiments, analog signal combiner 244 may include a signal coupler or a signal transformer.

In some demonstrative embodiments, the plurality of filters 232 corresponding to an Rx chain, e.g., Rx chain 213, may include a plurality of preconfigured filters, wherein a preconfigured filter of the plurality of preconfigured filters may include a plurality of preset filter coefficients, e.g., as described below.

In some demonstrative embodiments, the coefficients of the plurality of filters 232 corresponding to the Rx chain, e.g., Rx chain 213, may be calibrated, for example, in an anechoic room, e.g., as described below. In one example, in the calibrated scheme, each of the N receive channels may receive nothing but the leakage signals, e.g., as no signal is reflected from targets, due to the anechoic room.

In some demonstrative embodiments, as shown in FIG. 2, impulse response of Rx chains 212 and Tx chains 210, for example, excluding antennas, may be denoted $h_{RX}(t)$ and $h_{TX}(t)$, respectively. In one example, it may be assumed that all Rx chains 212 are identical, and/or all Tx chains 210 are identical.

In some demonstrative embodiments, a model of a complex envelope of a received signal, denoted $r_i(t)$, may be down-converted and sampled by the i-th receiver of MIMO radar 204, e.g., as follows:

$$r_i(t) = \sum_{j=1}^{M} s_j(t) * h_{TX}(t) * \tilde{a}_{ij}(t) * h_{RX}(t), i = 1, \ldots, N \quad (1)$$

wherein:
* denotes convolution operation $s_j(t)$ denotes the complex envelope of the j-th transmit signal (j=1, ..., M). The samples of the signal $\{s_j[n]\}$ (or $s_j$ in vector representation) may be stored in each transmitter's RAM. The samples may be converted to analog I,Q signals and up-converted using DACs and mixer.

$\tilde{a}_{ij}(t)$ denotes the impulse response between j-th transmitter's antenna and i-th receiver's antenna In some demonstrative embodiments, samples of received signals may be written in vector representation, for example, as $r_1, \ldots, r_N$.

In some demonstrative embodiments, the model of the complex envelope $r_i(t)$ may be represented in frequency domain, e.g., discrete time, for example, using Fourier transforms of the signals and the frequency responses, e.g., as follows:

$$R_i(e^{j\omega}) = H_{TX}(e^{j\omega}) \cdot H_{RX}(e^{j\omega}) \cdot \sum_{j=1}^{M} \tilde{A}_{ij}(e^{j\omega}) \cdot S_j(e^{j\omega}), i = 1, \ldots, N, \forall \omega \quad (2)$$

In some demonstrative embodiments, a DFT coefficients representation may be determined as follows, e.g., assuming K coefficients:

$$R_i^k = \sum_{j=1}^{M} H_{TX}^k \cdot H_{RX}^k \cdot \tilde{A}_{ij}^k \cdot S_j^k, i = 1, \ldots, N, k = 1, \ldots, K \quad (3)$$

In some demonstrative embodiments, as shown in FIG. 2, a complex envelope of the leakage cancellation signal, denoted $z_i(t)$, may pass through a DAC, e.g., DAC 242, and a mixer, and may then be injected into the i-th receiver, for example, using a coupler and/or any other combiner component.

In some demonstrative embodiments, it may be assumed that the impulse response of a Tx chain of the leakage cancellation signal is identical to the impulse response of a Tx chain of a regular transmitter, denoted $h_{TX}(t)$.

In some demonstrative embodiments, samples of leakage cancellation signals, denoted $\{z_i[n]\}, i=1, \ldots, N$, may be calculated, for example, in the ASIC, using, for example, Finite Impulse Response (FIR) filters, each having a length L, e.g., even without any RAM or other memory.

In some demonstrative embodiments, the samples of leakage cancellation signals may be represented in discrete time, e.g., as follows:

$$z_i[n] = \sum_{j=1}^{M} h_{ij}[n] * s_j[n], i = 1, \ldots, N \quad (4)$$

$$z_i[n] = \sum_{j=1}^{M} \sum_{l=0}^{L-1} h_{ij}[l] \cdot s_j[n-l] \quad (5)$$

The DFT coefficients of the i-th cancellation signal may be determined, e.g., as follows:

$$Z_i^k = \sum_{j=1}^{M} H_{ij}^k \cdot S_j^k, i = 1, \ldots, N, k = 1, \ldots, K \quad (6)$$

wherein $\{H_{ij}^k\}_{k=0, \ldots, K-1}$ denotes the K DFT coefficients of $h_{ij}[n]$.

In some demonstrative embodiments, samples of received signals, e.g., while leakage cancelation signals are fed into the Rx chains, e.g., Rx chains 212, may be represented by DFT coefficients, e.g., as follows:

$$R_i^k = \sum_{j=1}^{M} H_{TX}^k \cdot H_{RX}^k \cdot \tilde{A}_{ij}^k \cdot S_j^k + \sum_{j=1}^{M} H_{TX}^k \cdot H_{RX}^k \cdot H_{ij}^k \cdot S_j^k, \quad (7)$$

$$i = 1, \ldots, N, k = 1, \ldots, K$$

$$R_i^k = H_{TX}^k \cdot H_{RX}^k \cdot \sum_{j=1}^{M} (\tilde{A}_{ij}^k + H_{ij}^k) \cdot S_j^k \quad (8)$$

In some demonstrative embodiments, the MIMO filtering technique may be implemented by MIMO filter 232 on the samples of M transmit signals, e.g., $s_1, \ldots, s_M$ in vector representation, and thus the samples of N optimal leakage cancellation signals may be achieved.

In some demonstrative embodiments, coefficients of the M*N optimal filters, denoted $\{h_{ij}[l]\}_{l=0}^{L-1}$, in the MIMO filter network 232 may be estimated from the samples of received signals $r_1, \ldots, r_N$.

In some demonstrative embodiments, the energy of each received signal may be minimized, e.g., for each i-th receiver index, for example, by summing up the leakage signal and the cancellation signal, for example, in the closed-loop, e.g., as follows:

$$\{H_{ij}^k\}_{j=1,\ldots,M \atop k=0,\ldots,K-1} = \arg\min \sum_{k=0}^{K-1} |R_i^k|^2, i = 1, \ldots, N \quad (9)$$

wherein $\{H_{ij}^k\}_{k=0}^{K-1}$ are K DFT coefficients of $\{h_{ij}[l]\}_{l=0}^{L-1}$ In some demonstrative embodiments, the minimization for each bin k may be applied separately, due to the fact that bins of DFT are statistically independent, e.g., orthogonal, for example, as follows:

$$\{H_{ij}^k\}_{j=1,\ldots,M} = \arg\min |R_i^k|^2, i = 1, \ldots, N, k = 0, \ldots, K-1 \quad (10)$$

$$\{H_{ij}^k\}_{j=1,\ldots,M} = \arg\min \left|\sum_{j=1}^{M} (\tilde{A}_{ij}^k + H_{ij}^k) \cdot S_j^k\right|^2, \quad (11)$$

$$i = 1, \ldots, N, k = 0, \ldots, K-1$$

In some demonstrative embodiments, for each i-th receiver and k (DFT bin), Equation (10) and Equation (11) may represent an optimization problem of dimension M, e.g., N*K optimization problems of dimension M each.

In some demonstrative embodiments, in order to simplify the optimization problem, each transmit may be activated separately to estimate each transmit's specific $\{H_{ij}^k\}$. Accordingly, the optimization problem may be simplified to M*N*K optimization problems of each of a single dimension, e.g., as follows:

$$H_{ij}^k = \arg\min |(\tilde{A}_{ij}^k + H_{ij}^k) \cdot S_j^k|^2, i=1, \ldots, \\ N, k=0, \ldots, K-1, j=0, \ldots, M-1 \quad (12)$$

In some demonstrative embodiments, for each i,j, $\{h_{ij}[l]\}_{l=0}^{L-1}$ may be calculated, e.g., as inverse-DFT coefficients of $\{H_{ij}^k\}_{k=0}^{K-1}$.

In some demonstrative embodiments, the coefficients of the plurality of filters of MIMO filter 232 corresponding to an Rx chain, e.g., Rx chain 213, may be, for example, dynamically adapted based, for example, on range-Doppler response information from a radar processor, e.g., as described below.

In some demonstrative embodiments, the coefficients of the plurality of filters of MIMO filter 232 corresponding to the Rx chain, e.g., Rx chain 213, may be, for example, dynamically adapted based on a range-Doppler response bin comprising a zero Doppler value and a smallest range value compared to other range-Doppler response bins comprising the zero Doppler value, e.g., as described below.

In some demonstrative embodiments, the coefficients of the plurality of filters of MIMO filter 232 corresponding to the Rx chain, e.g., Rx chain 213, may be estimated and/or dynamically adapted, for example, during normal operation of MIMO radar 204.

In some demonstrative embodiments, the model of the complex envelope $r_i(t)$ of a received signal down-converted and sampled by the i-th receiver may be determined, for example, according to the Equation (1).

In some demonstrative embodiments, one or more of the following assumptions may be made:

Tx and Rx chains, for example, Tx chains 210 and Rx chains 212, are calibrated, e.g., equalized, e.g., as follows:

$$h_{TX}(t) * h_{RX}(t) = \delta(t) \qquad (13)$$

A leakage between each Tx and Rx antenna pair is modeled as a single tap channel, which may be expressed, e.g., as follows:

$$\tilde{a}_{ij}(t) \approx z_{ij} \cdot \delta(t - \tau_{ij}) \qquad (14)$$

A leakage between each Tx and Rx antenna pair in DFT form may be expressed, e.g., as follows:

$$\tilde{A}_{ij}^k \approx z_{ij} \cdot e^{j\frac{2\pi}{K} k \cdot \tau_{ij}} \qquad (15)$$

In some demonstrative embodiments, the Equation (1) may be simplified, for example, based on the assumptions (13), (14), and (15), e.g., as follows:

$$r_i(t) \approx \sum_{j=1}^{M} z_{ij} \cdot s_j(t - \tau_{ij}), i = 1, \ldots, N \qquad (16)$$

In some demonstrative embodiments, the leakage may appear to be like a target with the following properties, for example, after the matched filter, and calculation of a complex ambiguity function (CAF):

very small range ($\tau_{ij}$ is very small), close to zero zero Doppler

In one example, a target may be in near zero range bin, and zero Doppler bin.

In some demonstrative embodiments, according to the MIMO radar theory, there may be a different CAF, denoted $CAF_{ij}$, e.g., for each of the M*N virtual elements.

In some demonstrative embodiments, sets of $\{z_{ij}, \tau_{ij}\}$ may be estimated, for example, by finding the peak of each CAF, near the zero range bin, at the zero Doppler bin, e.g., assuming there is no real target there, as follows:

$\hat{\tau}_{ij}$=arg max $CAF_{ij}(\tau, \gamma=0)$ (search at low values of $\tau$)

$\hat{z}_{ij} = CAF_{ij}(\hat{\tau}_{ij}, \gamma=0) \qquad (17)$

In some demonstrative embodiments, the DFT coefficients $H_{ij}^k$ may be chosen, e.g., as follows:

$$H_{ij}^k = -\tilde{A}_{ij}^k = -\hat{z}_{ij} \cdot e^{j\frac{2\pi}{K} k \cdot \tau_{ij}} \qquad (18)$$

In some demonstrative embodiments, the filtering coefficients $\{h_{ij}[l]\}_{l=0}^{L-1}$ may be calculated as inverse-DFT coefficients of $\{H_{ij}^k\}_{k=0}^{K-1}$, for example, for each i, j.

Figure 3:
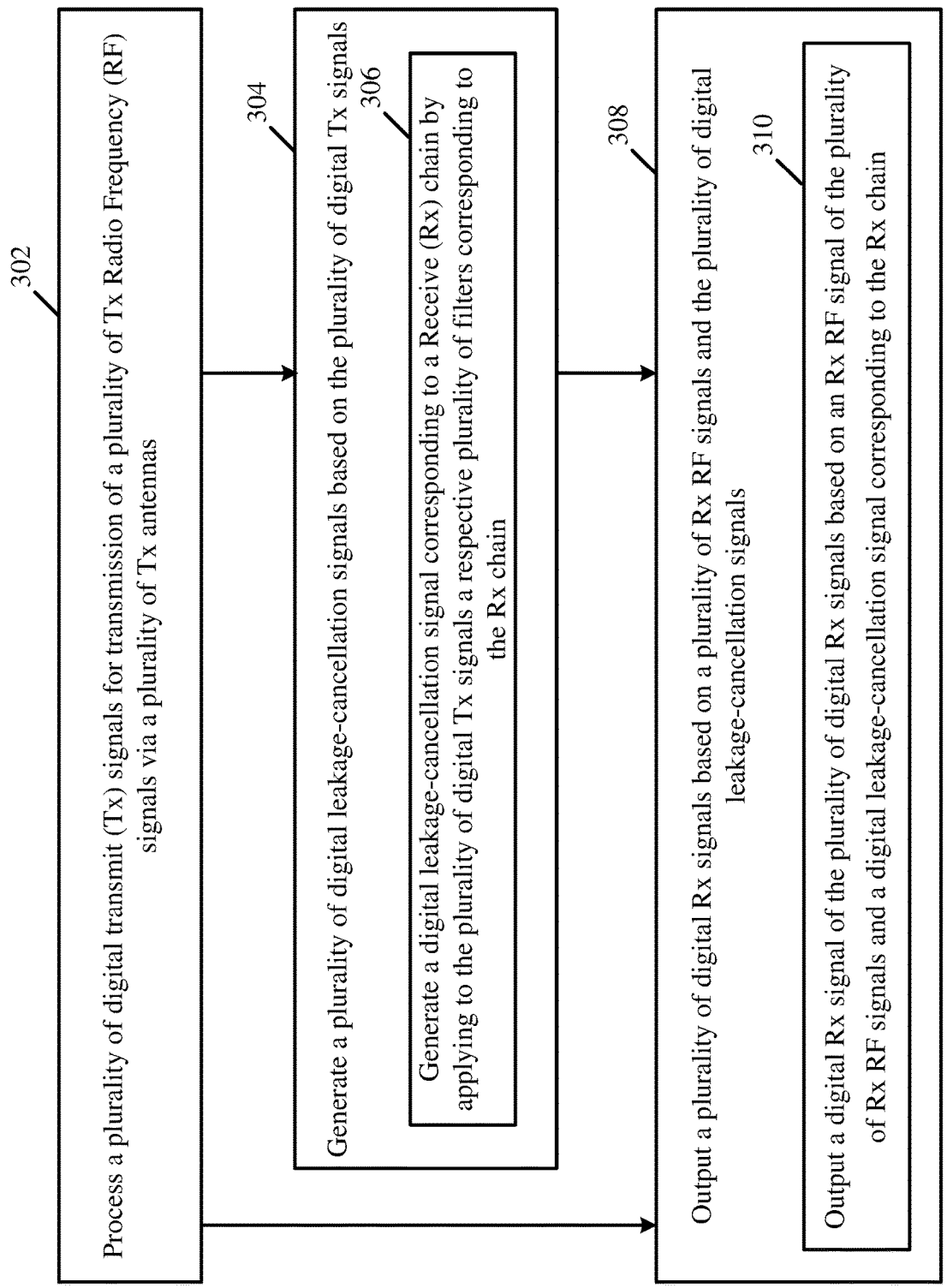
FIG. 3 is a schematic flow-chart illustration of a method of leakage cancellation for MIMO radar, in accordance with some demonstrative embodiments.

Reference is made to FIG. 3, which schematically illustrates a method of leakage cancellation for Multiple Input Multiple Output (MIMO) radar, in accordance with some demonstrative embodiments. For example, one or more of the operations of the method of FIG. 3 may be performed by one or more elements of a system, e.g., system 100 (FIG. 1), for example, one or more vehicles, e.g., vehicle 102 (FIG. 1), a MIMO radar, e.g., MIMO radar 104 (FIG. 1), transmit (Tx) chains, e.g., Tx chains 110 (FIG. 1), receive (Rx) chains, e.g., Rx chains 112 (FIG. 1), a MIMO Filter, e.g., MIMO Filter 132 (FIG. 1), a Digital to Analog Converter (DAC), e.g., DAC 142 (FIG. 1), an Analog Signal Combiner, e.g., Analog Signal Combiner 144 (FIG. 1), and/or a radar processor, e.g., radar processor 134 (FIG. 1).

As indicated at block 302, the method may include processing a plurality of digital Tx signals for transmission of a plurality of Tx Radio Frequency (RF) signals via a plurality of Tx antennas. For example, radar processor 134 (FIG. 1) may cause the plurality of Tx chains 110 (FIG. 1) to process the plurality of digital Tx signals 105 (FIG. 1) for transmission of the plurality of Tx Radio RF signals via the plurality of Tx antennas 114 (FIG. 1), e.g., as described above.

As indicated at block 304, the method may include generating a plurality of digital leakage-cancellation signals based on the plurality of digital Tx signals. For example, digital MIMO filter 132 (FIG. 1) may generate the plurality of digital leakage-cancellation signals based on the plurality of digital Tx signals 105 (FIG. 1), e.g., as described above.

As indicated at block 308, the method may include outputting a plurality of digital Rx signals based on a plurality of Rx RF signals and the plurality of digital leakage-cancellation signals. For example, the plurality of Rx chains 112 (FIG. 1) may output the plurality of digital Rx signals 151 (FIG. 1) based on a plurality of Rx RF signals, which may be received via the plurality of Rx antennas 116 (FIG. 1), and the plurality of digital leakage-cancellation signals, e.g., as described above.

As indicated at block 306, generating the plurality of digital leakage-cancellation signals may include generating a digital leakage cancellation signal corresponding to an Rx chain by applying to the plurality of digital Tx signals a respective plurality of filters corresponding to the Rx chain. For example, MIMO filter 132 may generate digital leakage-cancellation signal 103 (FIG. 1) corresponding to Rx chain 113 (FIG. 1) by applying to the plurality of digital Tx signals 105 (FIG. 1) a respective plurality of filters corresponding to Rx chain 113 (FIG. 1), e.g., as described above.

As indicated at block 310, outputting the plurality of digital Rx signals may include outputting a digital Rx signal of the plurality of digital Rx signals based on an Rx RF signal of the plurality of Rx RF signals and a digital leakage-cancellation signal corresponding to the Rx chain. For example, Rx chain 113 (FIG. 1) may be configured to output digital Rx signal 111 (FIG. 1) based on Rx RF signal 117 (FIG. 1) and digital leakage-cancellation signal 103 (FIG. 1) corresponding to Rx chain 113 (FIG. 1), e.g., as described above.

Figure 4:
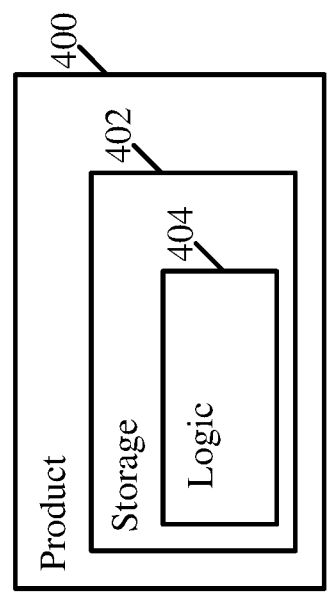
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include one or more tangible computer-readable ("machine-readable") non-transitory storage media 402, which may include computer-executable instructions, e.g., implemented by logic 404, operable to, when executed by at least one computer processor, enable the at least one computer processor to implement one or more operations at vehicle 102 (FIG. 1), MIMO radar 104 (FIG. 1), MIMO filter 132 (FIG. 1), and/or radar processor 134 (FIG. 1), to perform, trigger and/or implement one or more operations and/or functionalities at vehicle 102 (FIG. 1), MIMO radar 104 (FIG. 1), MIMO filter 132 (FIG. 1), and/or radar processor 134 (FIG. 1), and/or to perform, trigger and/or implement one or more operations and/or functionalities described with reference to the FIGS. 1, 2, and/or 3, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative embodiments, product 400 and/or storage media 402 may include one or more types of computer-readable storage media capable of storing data, including volatile memory, non-volatile memory, removable or non-removable memory, erasable or non-erasable memory, writeable or re-writeable memory, and the like. For example, storage media 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a Multiple-Input-Multiple Output (MIMO) radar, the MIMO radar comprising a plurality of Transmit (Tx) chains to process a plurality of digital Tx signals for transmission of a plurality of Tx Radio Frequency (RF) signals via a plurality of Tx antennas; a plurality of Receive (Rx) chains configured to output a plurality of digital Rx signals based on a plurality of Rx RF signals and a plurality of digital leakage-cancellation signals, the plurality of Rx RF signals to be received via a plurality of Rx antennas, wherein an Rx chain of the plurality of Rx chains is configured to output a digital Rx signal of the plurality of digital Rx signals based on an Rx RF signal of the plurality of Rx RF signals and a digital leakage-cancellation signal corresponding to the Rx chain; and a digital MIMO filter to generate the plurality of digital leakage-cancellation signals based on the plurality of digital Tx signals, the digital MIMO filter configured to generate the digital leakage-cancellation signal corresponding to the Rx chain by applying to the plurality of digital Tx signals a respective plurality of filters corresponding to the Rx chain.

Example 2 includes the subject matter of Example 1, and optionally, wherein the Rx chain comprises a Digital to Analog Converter (DAC) to convert the digital leakage-cancellation signal corresponding to the Rx chain into an analog leakage-cancellation signal; and an analog signal combiner to combine the analog leakage-cancellation signal with an analog Rx signal, which is based on the Rx RF signal.

Example 3 includes the subject matter of Example 2, and optionally, wherein the analog signal combiner is configured to combine the analog leakage-cancellation signal with the analog Rx signal in an RF section of the Rx chain.

Example 4 includes the subject matter of Example 3, and optionally, wherein the analog signal combiner is configured to combine the analog leakage-cancellation signal with the analog Rx signal at a mixer output of the Rx chain.

Example 5 includes the subject matter of Example 3, and optionally, wherein the analog signal combiner is configured to combine the analog leakage-cancellation signal with the analog Rx signal at an input to a Low Noise Amplifier (LNA) of the Rx chain.

Example 6 includes the subject matter of Example 3, and optionally, wherein the analog signal combiner is configured to combine the analog leakage-cancellation signal with the analog Rx signal after a Low Noise Amplifier (LNA) of the Rx chain.

Example 7 includes the subject matter of Example 2, and optionally, wherein the analog signal combiner is configured to combine the analog leakage-cancellation signal with the analog Rx signal in a baseband section of the Rx chain.

Example 8 includes the subject matter of any one of Examples 2-7, and optionally, wherein the analog signal combiner comprises a signal coupler or a signal transformer.

Example 9 includes the subject matter of any one of Examples 1-8, and optionally, wherein the digital MIMO filter comprises an adaptive MIMO filter configured to dynamically adapt coefficients of the plurality of filters corresponding to the Rx chain based on range-Doppler response information from a radar processor.

Example 10 includes the subject matter of Example 9, and optionally, wherein the adaptive MIMO filter is configured to dynamically adapt the coefficients of the plurality of filters corresponding to the Rx chain based on a range-Doppler response bin comprising a zero Doppler value and a smallest range value compared to other range-Doppler response bins comprising the zero Doppler value.

Example 11 includes the subject matter of any one of Examples 1-8, and optionally, wherein the plurality of filters corresponding to the Rx chain comprises a plurality of preconfigured filters, a preconfigured filter of the plurality of preconfigured filters comprising a plurality of preset filter coefficients.

Example 12 includes the subject matter of any one of Examples 1-11, and optionally, wherein coefficients of the plurality of filters corresponding to the Rx chain are based on an Rx impulse response of the Rx chain, a plurality of Tx impulse responses of the plurality of Tx chains, and a plurality of leakage impulse responses between the plurality of Tx antennas and an Rx antenna corresponding to the Rx chain.

Example 13 includes the subject matter of any one of Examples 1-12, and optionally, wherein the digital MIMO filter is configured to generate the digital leakage-cancellation signal corresponding to the Rx chain to reduce leakage from the plurality of Tx antennas to the Rx chain.

Example 14 includes the subject matter of any one of Examples 1-13, and optionally, comprising the plurality of Tx antennas and the plurality of Rx antennas.

Example 15 includes the subject matter of any one of Examples 1-14, and optionally, comprising a radar processor configured to determine a range-Doppler response based on the plurality of digital Rx signals.

Example 16 includes the subject matter of any one of Examples 1-15, and optionally, comprising a vehicle.

Example 17 includes a Multiple-Input-Multiple Output (MIMO) radar comprising a plurality of Transmit (Tx) antennas; a plurality of Receive (Rx) antennas; a plurality of Tx chains to process a plurality of digital Tx signals for transmission of a plurality of Tx Radio Frequency (RF) signals via the plurality of Tx antennas; a plurality of Rx chains configured to output a plurality of digital Rx signals based on a plurality of Rx RF signals and a plurality of digital leakage-cancellation signals, the plurality of Rx RF signals to be received via the plurality of Rx antennas, wherein an Rx chain of the plurality of Rx chains is configured to output a digital Rx signal of the plurality of digital Rx signals based on an Rx RF signal of the plurality of Rx RF signals and a digital leakage-cancellation signal corresponding to the Rx chain; a digital MIMO filter to generate the plurality of digital leakage-cancellation signals based on the plurality of digital Tx signals, the digital MIMO filter configured to generate the digital leakage-cancellation signal corresponding to the Rx chain by applying to the plurality of digital Tx signals a respective plurality of filters corresponding to the Rx chain; and a radar processor configured to determine range-Doppler response information based on the plurality of digital Rx signals.

Example 18 includes the subject matter of Example 17, and optionally, wherein the Rx chain comprises a Digital to Analog Converter (DAC) to convert the digital leakage-cancellation signal corresponding to the Rx chain into an analog leakage-cancellation signal; and an analog signal combiner to combine the analog leakage-cancellation signal with an analog Rx signal, which is based on the Rx RF signal.

Example 19 includes the subject matter of Example 18, and optionally, wherein the analog signal combiner is configured to combine the analog leakage-cancellation signal with the analog Rx signal in an RF section of the Rx chain.

Example 20 includes the subject matter of Example 19, and optionally, wherein the analog signal combiner is configured to combine the analog leakage-cancellation signal with the analog Rx signal at a mixer output of the Rx chain.

Example 21 includes the subject matter of Example 19, and optionally, wherein the analog signal combiner is configured to combine the analog leakage-cancellation signal with the analog Rx signal at an input to a Low Noise Amplifier (LNA) of the Rx chain.

Example 22 includes the subject matter of Example 19, and optionally, wherein the analog signal combiner is configured to combine the analog leakage-cancellation signal with the analog Rx signal after a Low Noise Amplifier (LNA) of the Rx chain.

Example 23 includes the subject matter of Example 18, and optionally, wherein the analog signal combiner is configured to combine the analog leakage-cancellation signal with the analog Rx signal in a baseband section of the Rx chain.

Example 24 includes the subject matter of any one of Examples 18-23, and optionally, wherein the analog signal combiner comprises a signal coupler or a signal transformer.

Example 25 includes the subject matter of any one of Examples 17-24, and optionally, wherein the digital MIMO filter comprises an adaptive MIMO filter configured to dynamically adapt coefficients of the plurality of filters corresponding to the Rx chain based on the range-Doppler response information from the radar processor.

Example 26 includes the subject matter of Example 25, and optionally, wherein the adaptive MIMO filter is configured to dynamically adapt the coefficients of the plurality of filters corresponding to the Rx chain based on a range-Doppler response bin comprising a zero Doppler value and a smallest range value compared to other range-Doppler response bins comprising the zero Doppler value.

Example 27 includes the subject matter of any one of Examples 17-24, and optionally, wherein the plurality of filters corresponding to the Rx chain comprises a plurality of preconfigured filters, a preconfigured filter of the plurality of preconfigured filters comprising a plurality of preset filter coefficients.

Example 28 includes the subject matter of any one of Examples 17-27, and optionally, wherein coefficients of the plurality of filters corresponding to the Rx chain are based on an Rx impulse response of the Rx chain, a plurality of Tx impulse responses of the plurality of Tx chains, and a plurality of leakage impulse responses between the plurality of Tx antennas and an Rx antenna corresponding to the Rx chain.

Example 29 includes the subject matter of any one of Examples 17-28, and optionally, wherein the digital MIMO filter is configured to generate the digital leakage-cancellation signal corresponding to the Rx chain to reduce leakage from the plurality of Tx antennas to the Rx chain.

Example 30 includes a vehicle comprising a Multiple-Input-Multiple Output (MIMO) radar configured to generate radar information, the MIMO radar comprising a plurality of Transmit (Tx) antennas; a plurality of Receive (Rx) antennas; a plurality of Tx chains to process a plurality of digital Tx signals for transmission of a plurality of Tx Radio Frequency (RF) signals via the plurality of Tx antennas; a plurality of Rx chains configured to output a plurality of digital Rx signals based on a plurality of Rx RF signals and a plurality of digital leakage-cancellation signals, the plurality of Rx RF signals to be received via the plurality of Rx antennas, wherein an Rx chain of the plurality of Rx chains is configured to output a digital Rx signal of the plurality of digital Rx signals based on an Rx RF signal of the plurality of Rx RF signals and a digital leakage-cancellation signal corresponding to the Rx chain; a digital MIMO filter to generate the plurality of digital leakage-cancellation signals based on the plurality of digital Tx signals, the digital MIMO filter configured to generate the digital leakage-cancellation signal corresponding to the Rx chain by applying to the plurality of digital Tx signals a respective plurality of filters corresponding to the Rx chain; and a radar processor configured to determine the radar information based on the plurality of digital Rx signals; and a system controller configured to control one or more vehicular systems of the vehicle based on the radar information.

Example 31 includes the subject matter of Example 30, and optionally, wherein the Rx chain comprises a Digital to Analog Converter (DAC) to convert the digital leakage-cancellation signal corresponding to the Rx chain into an analog leakage-cancellation signal; and an analog signal combiner to combine the analog leakage-cancellation signal with an analog Rx signal, which is based on the Rx RF signal.

Example 32 includes the subject matter of Example 31, and optionally, wherein the analog signal combiner is configured to combine the analog leakage-cancellation signal with the analog Rx signal in an RF section of the Rx chain.

Example 33 includes the subject matter of Example 32, and optionally, wherein the analog signal combiner is configured to combine the analog leakage-cancellation signal with the analog Rx signal at a mixer output of the Rx chain.

Example 34 includes the subject matter of Example 32, and optionally, wherein the analog signal combiner is configured to combine the analog leakage-cancellation signal with the analog Rx signal at an input to a Low Noise Amplifier (LNA) of the Rx chain.

Example 35 includes the subject matter of Example 32, and optionally, wherein the analog signal combiner is configured to combine the analog leakage-cancellation signal with the analog Rx signal after a Low Noise Amplifier (LNA) of the Rx chain.

Example 36 includes the subject matter of Example 31, and optionally, wherein the analog signal combiner is configured to combine the analog leakage-cancellation signal with the analog Rx signal in a baseband section of the Rx chain.

Example 37 includes the subject matter of any one of Examples 31-36, and optionally, wherein the analog signal combiner comprises a signal coupler or a signal transformer.

Example 38 includes the subject matter of any one of Examples 30-37, and optionally, wherein the digital MIMO filter comprises an adaptive MIMO filter configured to dynamically adapt coefficients of the plurality of filters corresponding to the Rx chain based on the radar information from the radar processor.

Example 39 includes the subject matter of Example 38, and optionally, wherein the adaptive MIMO filter is configured to dynamically adapt the coefficients of the plurality of filters corresponding to the Rx chain based on a range-Doppler response bin comprising a zero Doppler value and a smallest range value compared to other range-Doppler response bins comprising the zero Doppler value.

Example 40 includes the subject matter of any one of Examples 30-37, and optionally, wherein the plurality of filters corresponding to the Rx chain comprises a plurality of preconfigured filters, a preconfigured filter of the plurality of preconfigured filters comprising a plurality of preset filter coefficients.

Example 41 includes the subject matter of any one of Examples 30-40, and optionally, wherein coefficients of the plurality of filters corresponding to the Rx chain are based on an Rx impulse response of the Rx chain, a plurality of Tx impulse responses of the plurality of Tx chains, and a plurality of leakage impulse responses between the plurality of Tx antennas and an Rx antenna corresponding to the Rx chain.

Example 42 includes the subject matter of any one of Examples 30-41, and optionally, wherein the digital MIMO filter is configured to generate the digital leakage-cancellation signal corresponding to the Rx chain to reduce leakage from the plurality of Tx antennas to the Rx chain.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a Multiple-Input-Multiple Output (MIMO) radar, the MIMO radar comprising:
a plurality of Transmit (Tx) chains to process a plurality of digital Tx signals for transmission of a plurality of Tx Radio Frequency (RF) signals via a plurality of Tx antennas;
a plurality of Receive (Rx) chains configured to output a plurality of digital Rx signals based on a plurality of Rx RF signals and a plurality of digital leakage-cancellation signals, the plurality of Rx RF signals to be received via a plurality of Rx antennas, wherein an Rx chain of the plurality of Rx chains is configured to output a digital Rx signal of the plurality of digital Rx signals based on an Rx RF signal of the plurality of Rx RF signals and a digital leakage-cancellation signal corresponding to the Rx chain; and
a digital MIMO filter to generate the plurality of digital leakage-cancellation signals based on the plurality of digital Tx signals, the digital MIMO filter configured to generate the digital leakage-cancellation signal corresponding to the Rx chain by applying to the plurality of digital Tx signals a respective plurality of filters corresponding to the Rx chain, wherein coefficients of the plurality of filters corresponding to the Rx chain are based on an Rx impulse response of the Rx chain, a plurality of Tx impulse responses of the plurality of Tx chains, and a plurality of leakage impulse responses between the plurality of Tx antennas and an Rx antenna corresponding to the Rx chain.

2. The apparatus of claim 1, wherein the Rx chain comprises:
a Digital to Analog Converter (DAC) to convert the digital leakage-cancellation signal corresponding to the Rx chain into an analog leakage-cancellation signal; and an analog signal combiner to combine the analog leakage-cancellation signal with an analog Rx signal, which is based on the Rx RF signal.

3. The apparatus of claim 2, wherein the analog signal combiner is configured to combine the analog leakage-cancellation signal with the analog Rx signal in an RF section of the Rx chain.

4. The apparatus of claim 3, wherein the analog signal combiner is configured to combine the analog leakage-cancellation signal with the analog Rx signal at a mixer output of the Rx chain.

5. The apparatus of claim 3, wherein the analog signal combiner is configured to combine the analog leakage-cancellation signal with the analog Rx signal at an input to a Low Noise Amplifier (LNA) of the Rx chain.

6. The apparatus of claim 3, wherein the analog signal combiner is configured to combine the analog leakage-cancellation signal with the analog Rx signal after a Low Noise Amplifier (LNA) of the Rx chain.

7. The apparatus of claim 2, wherein the analog signal combiner is configured to combine the analog leakage-cancellation signal with the analog Rx signal in a baseband section of the Rx chain.

8. The apparatus of claim 2, wherein the analog signal combiner comprises a signal coupler or a signal transformer.

9. The apparatus of claim 1, wherein the digital MIMO filter comprises an adaptive MIMO filter configured to dynamically adapt the coefficients of the plurality of filters corresponding to the Rx chain based on range-Doppler response information from a radar processor.

10. The apparatus of claim 9, wherein the adaptive MIMO filter is configured to dynamically adapt the coefficients of the plurality of filters corresponding to the Rx chain based on a range-Doppler response bin comprising a zero Doppler value and a smallest range value compared to other range-Doppler response bins comprising the zero Doppler value.

11. The apparatus of claim 1, wherein the plurality of filters corresponding to the Rx chain comprises a plurality of preconfigured filters having preset filter coefficients.

12. The apparatus of claim 1, wherein the digital MIMO filter is configured to generate the digital leakage-cancellation signal corresponding to the Rx chain to reduce leakage from the plurality of Tx antennas to the Rx chain.

13. The apparatus of claim 1 comprising the plurality of Tx antennas and the plurality of Rx antennas.

14. The apparatus of claim 1 comprising a radar processor configured to determine a range-Doppler response based on the plurality of digital Rx signals.

15. A Multiple-Input-Multiple Output (MIMO) radar comprising:
a plurality of Transmit (Tx) antennas;
a plurality of Receive (Rx) antennas;
a plurality of Tx chains to process a plurality of digital Tx signals for transmission of a plurality of Tx Radio Frequency (RF) signals via the plurality of Tx antennas;
a plurality of Rx chains configured to output a plurality of digital Rx signals based on a plurality of Rx RF signals and a plurality of digital leakage-cancellation signals, the plurality of Rx RF signals to be received via the plurality of Rx antennas, wherein an Rx chain of the plurality of Rx chains is configured to output a digital Rx signal of the plurality of digital Rx signals based on an Rx RF signal of the plurality of Rx RF signals and a digital leakage-cancellation signal corresponding to the Rx chain;
a digital MIMO filter to generate the plurality of digital leakage-cancellation signals based on the plurality of digital Tx signals, the digital MIMO filter configured to generate the digital leakage-cancellation signal corresponding to the Rx chain by applying to the plurality of digital Tx signals a respective plurality of filters corresponding to the Rx chain, wherein coefficients of the plurality of filters corresponding to the Rx chain are based on an Rx impulse response of the Rx chain, a plurality of Tx impulse responses of the plurality of Tx chains, and a plurality of leakage impulse responses between the plurality of Tx antennas and an Rx antenna corresponding to the Rx chain; and
a radar processor configured to determine range-Doppler response information based on the plurality of digital Rx signals.

16. The MIMO radar of claim 15, wherein the Rx chain comprises:
a Digital to Analog Converter (DAC) to convert the digital leakage-cancellation signal corresponding to the Rx chain into an analog leakage-cancellation signal; and
an analog signal combiner to combine the analog leakage-cancellation signal with an analog Rx signal, which is based on the Rx RF signal.

17. The MIMO radar of claim 15, wherein the digital MIMO filter comprises an adaptive MIMO filter configured to dynamically adapt the coefficients of the plurality of filters corresponding to the Rx chain based on the range-Doppler response information from the radar processor.

18. The MIMO radar of claim 17, wherein the adaptive MIMO filter is configured to dynamically adapt the coefficients of the plurality of filters corresponding to the Rx chain based on a range-Doppler response bin comprising a zero Doppler value and a smallest range value compared to other range-Doppler response bins comprising the zero Doppler value.

19. The MIMO radar of claim 15, wherein the plurality of filters corresponding to the Rx chain comprises a plurality of preconfigured filters having preset filter coefficients.

20. The MIMO radar of claim 15, wherein the digital MIMO filter is configured to generate the digital leakage-cancellation signal corresponding to the Rx chain to reduce leakage from the plurality of Tx antennas to the Rx chain.

21. A vehicle comprising:
a Multiple-Input-Multiple Output (MIMO) radar configured to generate radar information, the MIMO radar comprising:
a plurality of Transmit (Tx) antennas;
a plurality of Receive (Rx) antennas;
a plurality of Tx chains to process a plurality of digital Tx signals for transmission of a plurality of Tx Radio Frequency (RF) signals via the plurality of Tx antennas;
a plurality of Rx chains configured to output a plurality of digital Rx signals based on a plurality of Rx RF signals and a plurality of digital leakage-cancellation signals, the plurality of Rx RF signals to be received via the plurality of Rx antennas, wherein an Rx chain of the plurality of Rx chains is configured to output a digital Rx signal of the plurality of digital Rx signals based on an Rx RF signal of the plurality of Rx RF signals and a digital leakage-cancellation signal corresponding to the Rx chain;
a digital MIMO filter to generate the plurality of digital leakage-cancellation signals based on the plurality of digital Tx signals, the digital MIMO filter configured to generate the digital leakage-cancellation signal corresponding to the Rx chain by applying to the plurality of digital Tx signals a respective plurality of filters corresponding to the Rx chain, wherein coefficients of the plurality of filters corresponding to the Rx chain are based on an Rx impulse response of the Rx chain, a plurality of Tx impulse responses of the plurality of Tx chains, and a plurality of leakage impulse responses between the plurality of Tx antennas and an Rx antenna corresponding to the Rx chain; and a radar processor configured to determine the radar information based on the plurality of digital Rx signals; and a system controller configured to control one or more vehicular systems of the vehicle based on the radar information.

22. The vehicle of claim 21, wherein the Rx chain comprises:

a Digital to Analog Converter (DAC) to convert the digital leakage-cancellation signal corresponding to the Rx chain into an analog leakage-cancellation signal; and an analog signal combiner to combine the analog leakage-cancellation signal with an analog Rx signal, which is based on the Rx RF signal.

23. The vehicle of claim 21, wherein the digital MIMO filter comprises an adaptive MIMO filter configured to dynamically adapt the coefficients of the plurality of filters corresponding to the Rx chain based on the radar information from the radar processor.

24. The vehicle of claim 23, wherein the adaptive MIMO filter is configured to dynamically adapt the coefficients of the plurality of filters corresponding to the Rx chain based on a range-Doppler response bin comprising a zero Doppler value and a smallest range value compared to other range-Doppler response bins comprising the zero Doppler value.

* * * * *